310-369 SR
XR 3,657,579

United States Patent [15] 3,657,579
Kramer [45] Apr. 18, 1972

[54] POWER SUPPLY CIRCUIT EMPLOYING PIEZOELECTRIC VOLTAGE TRANSFORMING DEVICE

[72] Inventor: Don A. Kramer, Rolling Meadows, Ill.
[73] Assignee: Motorola, Inc., Franklin Park, Ill.

[22] Filed: Apr. 16, 1971
[21] Appl. No.: 134,600

[52] U.S. Cl. ....................310/8.1, 178/DIG. 11, 310/9.5, 310/9.8
[51] Int. Cl. ....................H01v 7/00
[58] Field of Search....................310/8, 8.1, 8.2, 8.3, 8.7, 310/9.5, 9.7, 9.8; 315/1; 321/2 HF; 328/262; 178/DIG. 11

[56] References Cited

UNITED STATES PATENTS

| | | | |
|---|---|---|---|
| 3,562,792 | 6/1968 | Berlincourt et al. | 310/9.7 |
| 3,562,563 | 2/1971 | Schafft | 310/9.8 X |
| 3,487,237 | 12/1969 | Krenke | 310/8.1 |
| 3,535,655 | 10/1970 | Chidester | 310/8.1 X |
| 3,539,888 | 11/1970 | Prisco et al. | 310/8.1 X |

*Primary Examiner*—J. D. Miller
*Assistant Examiner*—B. A. Reynolds
*Attorney*—Vincent Rauner and L. Arnold

[57] ABSTRACT

A power supply circuit having a piezoelectric voltage transforming device resonant in a preselected one of a plurality of mechanical vibrational modes for transforming low primary alternating voltages to high secondary alternating voltages whereby the preselected mode is an optimum resonant mode having a range of operating frequencies over which the device resonates with changes in input impedance for the device. The primary alternating voltage is returned at a first operating frequency through a positive feedback circuit loop and an amplifier driver circuit to lock in the particular operating frequency of the device. The positive feedback loop has frequency selective means therein for determining the selection of the optimum resonant mode. Operating frequency can be altered through phase control of the primary feedback voltage within the positive loop, which change of operating frequency alters input impedance and hence the level of voltage transformation through the piezoelectric device.

12 Claims, 8 Drawing Figures

INVENTOR:
DON A. KRAMER
BY: Lester N. Arnold
ATTY.

INVENTOR:
DON A. KRAMER
BY: Lester R. Arnold
ATTY.

POWER SUPPLY CIRCUIT EMPLOYING PIEZOELECTRIC VOLTAGE TRANSFORMING DEVICE

BACKGROUND

This invention relates to power supply circuits employing piezoelectric voltage transforming devices, and more specifically, to a power supply circuit selective of the particular resonant frequency at which the transforming device operates.

Piezoelectric voltage transforming devices have relatively high step-up transformation rations for converting electrical to mechanical to electrical energy by means of the electromechanical impedance transformation of the piezoelectric material. This energy transformation occurs at a number of electrical resonant modes in which dimensionally related mechanical undulations or vibrations occur to effect an energy transformation or coupling through the device. Common configurations for such piezoelectric devices are ring-shaped and bar-shaped units such as those units set forth in U.S. Pat. Nos. 3,281,726 and 3,487,239, respectively, assigned to the assignee of the present invention and to which reference can be made for a more detailed description.

Each of these devices has a resonant mode that is an optimum mode due to being that mode at which the highest energy coupling factor between input (primary) and output (secondary) and least amount of insertion loss occurs. Also, at least the optimum resonant mode has an electrical series and a parallel resonant frequency with a range of operating frequencies therebetween. In particular, for the ring-shaped piezoelectric device, the optimum mode is known as the fundamental "hoop" mode characterized by a uniform increasing and decreasing of the radius of the ring. The ring also is known to have a "flexural" resonant mode characterized by a non-uniform fluctuation of the radius which is most often structurally damaging to the ring device. Accordingly, piezoelectric devices are more desirably operated in their optimum resonant modes, and precautions must be taken to guard against operation in harmful and less efficient vibrational modes.

It is a characteristic of the fundamental hoop mode for the piezoelectric ring-type voltage transformer that the input impedance of the ring device increases generally linearly from a minimum value at series resonance to a maximum value at parallel resonance under no load conditions. Loading affects this relationship slightly but the range of frequencies therebetween remains a convenient range over which to operate the ring for obtaining a desired voltage transformation. Therefore, by controlling the operating frequency of the ring device, the input impedance can be raised or lowered to thus lower or raise the secondary alternating voltage of the ring.

Such piezoelectric devices offer significant advantages in transformer applications over the standard electromagnetic type transformers, for example, smaller size, non-magnetic, self-insulating and inherently high-Q selectivity with close to a pure sine wave output for reducing high level harmonics which could be amplified from the energizing source. In a television receiver wherein electromagnetic transformers require special construction to prevent breakdown and insulation deterioration is of primary consideration, the piezoelectric device is especially useful to supply high level DC voltage to the screen of the picture tube. However, because the screen is a variable impedance load, the output voltage of the piezoelectric device must be regulated.

SUMMARY

It is an object of the present invention to provide a power supply circuit which is determinative of the electrical resonant mode of a piezoelectric ceramic device through the use of frequency selective means within a regenerative feedback circuit loop.

It is another object of the invention to provide the piezoelectric device itself as another frequency selective means for determining the particular operating frequency within its electrical resonant mode.

It is still another object to provide regulation of the secondary voltage for the ceramic transformer device through the use of a phase shifter control means to vary the operating resonant frequency and the input impedance of the transformer device.

It is yet another object to provide automatic regulation of the phase shifter control means through the use of a negative feedback circuit loop returning thereto a portion of the secondary alternating voltage of the device.

Another object of the invention is to provide an improved high voltage system for a cathode-ray tube such as used in a a television receiver.

In one specific embodiment, a power supply circuit employs a ring-shaped piezoelectric transformer having primary and secondary alternating voltages to supply a regulated output voltage to a variable impedance load such as a screen of a cathode-ray tube for a television receiver. An amplifier driver circuit used as a pulse generating means is coupled to the input of the transformer ring and includes a pair of alternately conducting transistors comprising switching means for driving the ring into its fundamental hoop mode of vibration. The operation of the ring is sustained by a regenerative (positive) feedback circuit loop coupling the primary alternating voltage of the ring back to the input of the driver circuit wherein the regenerative loop includes a first frequency selective means determinative of the resonant vibrational mode of the ring, and the ring comprises a second frequency selective means determinative of the particular operating frequency within the hoop resonant mode. A degenerative (negative) feedback circuit loop comprises a means of automatically regulating the secondary alternating voltage of the ring through a variable coupling with a phase shifter control means within the regenerative loop. The phase shifter control means provides a variation in the phase of the primary voltage of the ring to provide regulation of the operating frequency thereof and hence the voltage transformation through the ring.

THE DRAWING

DETAILED DESCRIPTION

Figure 1:
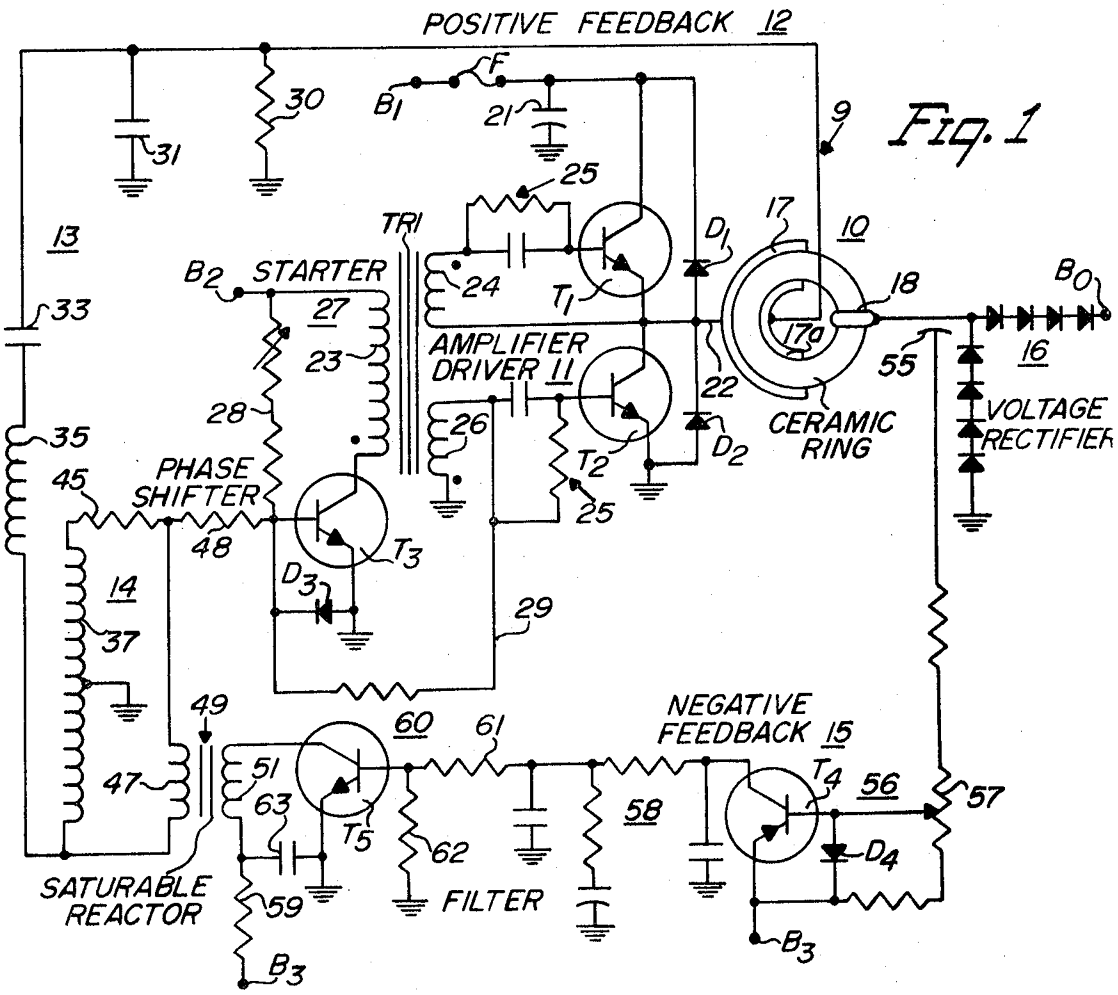
FIG. 1 is a schematic diagram of a power supply circuit useful with an impedance varying load, the circuit including a ring-shaped piezoelectric transformer device and having both positive and negative feedback circuit loops.
Figure 2:
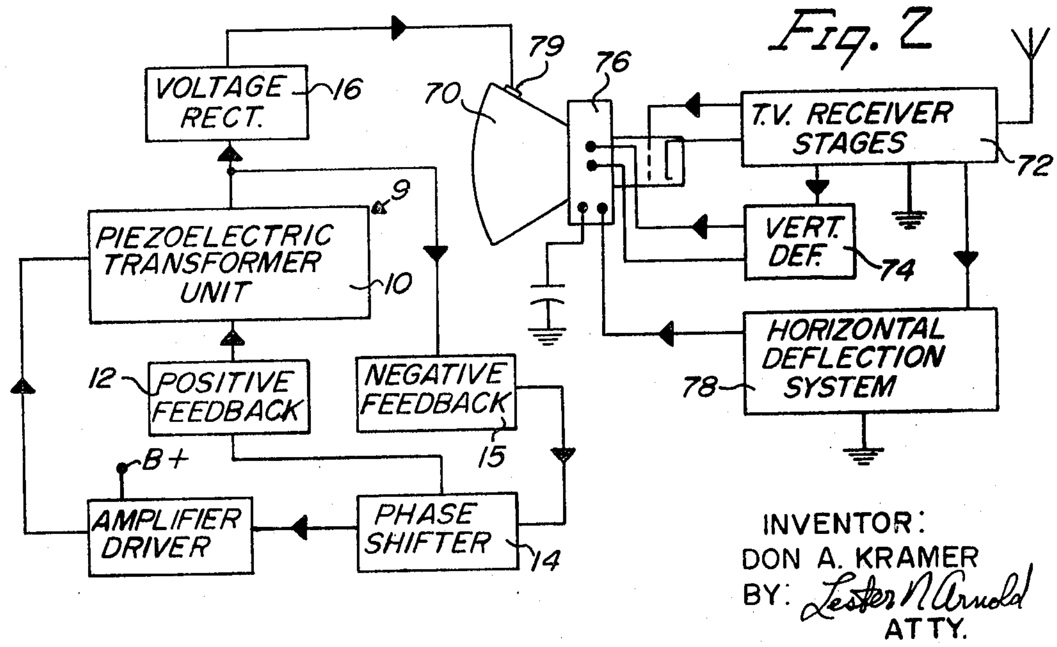
FIG. 2 shows a television receiver system partly in schematic and partly in block which illustrates one application for the power supply circuit of FIG. 1.

Referring to FIGS. 1 and 2, a power supply circuit 9 of the regulated output voltage type is device employing a piezoelectric voltage transforming device or unit 10 as its voltage generating element in place of standard electromagnetic type transformers. The piezoelectric transformer is of the ring-shaped configuration although it is to be noted that power supply circuits could be adapted to utilize any geometrical configuration useful to transform electrical to mechanical to electrical energy through electromechanical transformations. The power supply circuit 9 has been especially designed to employ both bar-shaped and ring-shaped devices, but specifically will be described in connection with the use of ring-shaped units.

The power supply circuit 9 includes an amplifier driver circuit 11 as its technique of driving the ring device 10 into operation, i.e., to set up electrical resonance at a particular operating frequency within its fundamental hoop mode of vibration which is known to be the optimum resonant mode for ring-shaped devices. The amplifier driver circuit 11 comprises generally pulse generating means, and specifically employs switching means to generate or develop a square wave voltage applied to the ring device 10. As stated above, the ring device transforms low primary alternating voltages to high secondary alternating voltages. The primary alternating voltage is made a reference for sustaining ring operation by being returned as a primary feedback voltage through a positive feedback circuit loop 12 to the amplifier driver circuit 11.

Now, it is important in describing this invention to set forth occasionally certain characteristics and principles of operation for the ring device 10. Such a device can be considered as an oscillatory device requiring energy replenishment to sustain its operation and having a transformed output voltage which is directly proportional to the physical distance between input and output electrodes therefor, and the Q of the ring member. Typical Q values for ceramic ring devices are generally 1,000 unloaded and 50 to 100 loaded. The ring 10 is an integral mechanical unit with its input and output sections very tightly coupled. Of course, the power requirements of each application must be taken into account in selecting a ring device capable of supporting fundamental hoop mode vibration, namely, the ring must have a certain annular configuration of a selected radial dimension, axial dimension (thickness) and mean circumference, which design considerations do not form a part of this specification.

Figure 3:
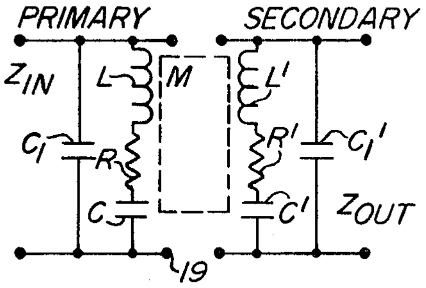
FIG. 3 is a schematic diagram of an equivalent electrical circuit of the ring device.

FIG. 3 shows the supply electrical circuit for the ring device 10 for its operation at series resonance frequency wherein the input impedance is low and the Q is maximum. The ring device 10 has its primary (input) and secondary (output) sections represented by series resonance circuits (L,R,C and L', R', C', respectively) in parallel with static capacitances ($C_1$ and $C_1'$, respectively) and electromechanically coupled together (M). The input and output sections have input and output impedances represented at $^{z}$IN and $^{z}$OUT, respectively, the output impedance being significantly larger than the input impedance and the magnitude of the input impedance being determinative of the magnitude of voltage transformation through the ring device 10.

The ring device has multiple dimensionally related resonant modes into which it could be driven, the hoop mode and flexural mode being related to the radial dimension of the ring device 10 and are the most common modes of operation. As the flexural mode is structurally detrimental to the ring device, it is essential that the ring be prevented from operating in this mode. Therefore, the positive feedback loop 12 includes a first frequency selective means 13 for determining the selection of the fundamental hoop mode. Further, for stabilizing the operation of the ring device 10 within the hoop mode, the ring device itself comprises a second frequency selective means effective through the positive feedback loop 12 to sustain or lock on a load-dependent operating frequency within a range of operating frequencies for the hoop mode.

Within the positive feedback loop 12, a phase shifter control means 14 is utilized to alter the phase of the primary feedback voltage prior to being reapplied to the input section of the ring device 10. An out-of-phase alteration to the oscillating ring operating at its series resonance frequency, as will be shown later, will result in an upward shift in operating frequency, a rise in input impedance and less voltage transformation through the ring device 10. Phase alteration can be accomplished through suitable adjustment means such as external controls useful for setting the desired level of output voltage for a constant load. Automatic phase alteration is obtained in the regulated power supply circuit 9 of FIGS. 1 and 2 through employing a negative feedback circuit loop 15 to monitor the output voltage level of the ring 10 and provide through a variable coupling with the phase shifter 14 a corresponding phase alteration for the primary feedback voltage. Additionally, a suitable voltage rectifier circuit 16 can be used to convert the secondary alternating voltages to a positive DC output voltage $B_0$.

The amplifier driver circuit 11 supplies alternating first and second voltage potentials comprising a square wave voltage to the input section of the ring device 10. It is apparent that any fluctuating voltage potential could be used to drive the ring 10 but that efficiency of the driver circuit 11 and excitation effect of the driving voltage on the ring device 10 is of considerable importance. For example, a sine wave voltage waveform is more useful in restricting or suppressing ring operation in other than the desired mode but is less efficient for the driver circuit 11. The square wave is generated by switching means comprising a pair of alternately conducting NPN-type driving transistors $T_1$ and $T_2$ being alternately driven into conduction through an electromagnetic transformer $TR_1$ in turn controlled by a switching amplifier transistor $T_3$, conveniently provided as an NPN-type. The switching rate of the transistor $T_3$ during normal operation of the ring device 10 corresponds to the ring's operating frequency.

The input section of the ring device 10 includes a pair of input electrodes or plates 17 and 17*a* conveniently shown as outer and inner plates, respectively. The output section of the ring is served by an output electrode 18 in the form of a band tightly surrounding the output section. The positive feedback loop 12 is shown coupled to the inner plate 17*a* but should be understood to represent the electrical equivalent of a coupling at 19 in FIG. 3. The ring device 10 can be constructed of a ceramic material such as barium titanate or lead titanate zirconate or other suitable material.

Now, considering the structure and operation of the driver circuit 11, the transistor $T_1$ has its emitter coupled to the input section of the ring device 10 through connecting lead 22 and has its collector coupled to a DC supply voltage $B_1$ through a fuse F and a capacitive filter 21. It is apparent that with conduction thereof the transistor $T_1$ will make available to the ring approximately the entire supply voltage $B_1$. The transistor $T_2$ has its collector to emitter path coupled between the input section of the ring and ground potential for providing a DC return path to ground with conduction of $T_2$ thereby avoiding a blocked condition for the ring device 10. The piezoelectric transformer lacks a DC return path in both input and output sections. Commutating diodes $D_1$ through $D_3$ provide reverse bias breakdown protection for the transistors $T_1$ through $T_3$, respectively.

The bases of both transistors $T_1$ and $T_2$ are biased to conduction (cut-on) and non-conduction (cut-off) by secondary coils 24 and 26 of transformer $TR_1$, respectively, through a pair of networks 25, each including a base feed resistor and a parallel capacitor intended primarily to speed up the cut-off time for its associated driving transistor. Thermal requirements for the transistors are low if good switching speed is achieved. A primary coil 23 is coupled between a second DC supply voltage $B_2$ and the collector of the switching transistor $T_3$ for providing voltage transformation to the secondary coils 24 and 26 with the conduction of transistor $T_3$ according to Lenz's law. Conventional dot-marking nomenclature is shown in FIG. 1 to identify like voltage polarities at any given time.

Therefore, with conduction of transistor $T_3$ and build-up of collector current through coil 23, a negative secondary voltage is applied to the base of transistor $T_1$ causing cut-off thereof and a positive secondary voltage is applied to the base of transistor $T_2$ supplying a ground path for the discharge of any residual charges on the input section of the ring device 10. Attainment of full-level DC collector current precipitates a collapse of coupling electromagnetic fields, thus reversing the polarities of these secondary voltages and the conduction states of the transistors $T_1$ and $T_2$ to thereby provide the supply voltage $B_1$ to the ring device 10. The operating frequency of the primary feedback voltage determines the rate at which the transistor $T_3$ is switched on and off to repeat the above-described sequence of events.

The driver circuit 11 requires the use of a starter circuit 27 to accomplish the switching of transistor $T_3$ for such time that is needed to bring the ring into operation at its fundamental hoop mode and sustain the same through the feedback of the primary alternating voltage. For this purpose, the base of the transistor $T_3$ is coupled to the supply voltage $B_2$ through a connecting lead 28 containing variable resistive elements and to the base input of the secondary coil 26 through a resistive connecting lead 29. The starter circuit furnishes forward bias to the base of $T_3$ causing it to cut on and conduct collector current through primary coil 23.

With the above-mentioned reversal of voltage potentials in coil 26, the base of the transistor $T_3$ is reverse biased to cut off through connecting lead 29 until the negative field of coil 26 collapses to the extent that the forward bias again is predominant to recycle these events. The switching rate of the transistor $T_3$ during start-up is, of course, significantly lower than the operating frequency of the ring during normal operation. Also, it should by understood that the use of this particular starter circuit 27 and the transformer $TR_1$ is but one technique of switching the driving transistors $T_1$ and $T_2$ and other suitable techniques will be apparent to those skilled in the pertinent art.

Figure 4:
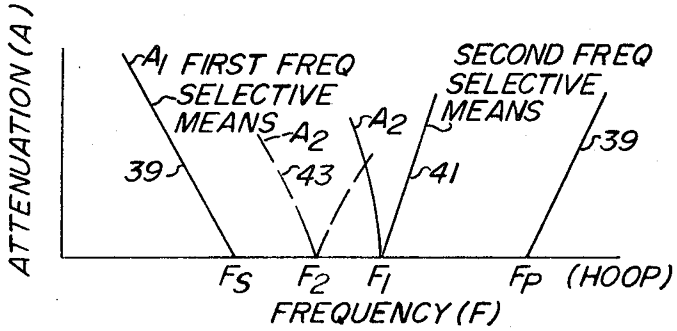
FIG. 4 is a representation of the attenuation of first and second frequency selective means as a function of frequency.

The first frequency selective means 13 comprises a composite filter means selective of the particular resonant mode of the ring device 10 and having a resonant response different from that of the ring itself. FIG. 4 shows a curve $A_1$ having skirts 39 serving as a graphical representation of the attenuation characteristics of the filter means 13 wherein the filter means has minimum attenuation or a pass band generally coinciding with the fundamental hoop mode of the ring device 10. Desirably, the pass band extends at least from series resonance $F_S$ to parallel resonance $F_P$ frequencies.

The attenuation curve $A_2$ of the second frequency selective means as shown in FIG. 4 represents a minimum attenuation centered sharply at a particular operating frequency, namely, a first frequency $F_1$ at 41 and a second frequency $F_2$ at 43. The second frequency selective means is attributable to the primary feedback voltage being used to control the switching rate of the transistor $T_3$. A shift from frequencies $F_1$ to $F_2$ or vice versa is accomplished by a phase alteration of the primary feedback voltage within the phase shifter 14.

The composite filter means 13 comprises a low pass filter generally in the form of a tapped capacitor network including a capacitor 31 coupled to ground across a resistor 30 and a capacitor 33 connected in series with a variable or tunable inductor coil 35 combined with a center tapped inductor coil 37 to provide a band pass filter generally in the form of a tapped inductor network. The resistor 30 provides a DC return path at the capacitive tap to dissipate any charge developed at this point through conduction of the output rectifier 16.

Therefore, the curve $A_1$ of FIG. 4 is representative of the combined filtering characteristics of the composite filter means 13 whereby a high Q resonant network is provided for avoiding ring operation in the nearby flexural mode as well as in other spurious modes. Typical values for the Q attainable are 20 to 30 for the filter configuration of FIG. 1, and the resonant frequency thereof is ideally somewhat below any operating frequency of the ring device 10. Also, the filter's resonant frequency is dependent upon the Q thereof and to a lesser extent any delay time that may occur in the driving transistors $T_1$ and $T_2$.

It would appear that a low pass filter could simply be employed as an adequate filter means or frequency attenuator for undesired higher frequencies provided that an upper or cut-off frequency is at least above the maximum operating frequency for the hoop mode. However, less change in attenuation per change in frequency (slope) for the skirts 39 of curve $A_1$ could permit ring operation in undesirable resonant modes; the band pass filter serves to steepen these slopes thereby to better define the attenuation characteristics of the filter means 13. Since both the ring device 10 as a source and the phase shifter 14 as a load are low in impedance, a tapping configuration for the filter means is required in order to achieve the desired Q levels. Also, the coil 35 suitably should have a self-resonance of some 40 to 1 that of the ring resonance if certain overload conditions would be avoided which might tend to cause the ring device 10 to oscillate in a spurious mode.

The phase shifter control means 14 comprises a resistor 45 and a load winding or inductor coil 47 providing an L-R circuit driven by the taped inductor coil 37. The output of the phase shifter 14 is directly coupled to the base of the switching transistor $T_3$ through a base feed resistor 48. An L-R circuit is known to provide a phase shift and the degree of phase shift obtained is variable due to the coil 47 being part of a saturable reactor 49 having a control winding or second inductor coil 51. External control means or the negative feedback loop 15 can then be used to vary the current through the coil 51 to thereby control the effective inductance of the coil 47 in the L-R phase shifter circuit 14.

Figure 5:
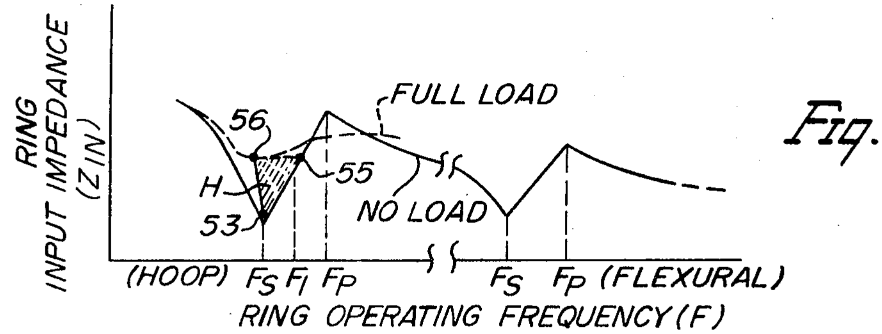
FIG. 5 is a representation of the input impedance of the ring as a function of frequency disclosing two resonant modes useful in explaining the operation of the invention.

FIG. 5 is generally illustrative of the variation of input impedance $Z_{IN}$ for the ring device 10 under no load conditions as a function of ring operating frequency over both the hoop and flexural modes. Additionally, the input impedance characteristic under the full load condition is shown over the hoop mode. In accordance with standard resonator theory, the input impedance $Z_{IN}$ is generally a minimum value and substantially resistive at series resonance $F_s$ and is generally a maximum value and highly inductive at parallel resonance $F_P$. Since it is a fundamental principal of the ring device 10 that the decrease of input impedance $Z_{IN}$ as compared to the output impedance $Z_{OUT}$ corresponds to an increase in impedance transformation for the ring, the maximum secondary output voltage is obtainable from the ring when the input impedance is a minimum value as indicated at 53 on the No Load curve of FIG. 5. Now, since voltage across the load varies inversely with changes in loading, point 53 is conveniently assigned the anticipated full load condition so that as loading decreases and load voltage would correspondingly increase, the phase shifter 14 can be used to vary the phase of the primary feedback voltage to the ring device 10 to accomplish retardation of the impedance transformation. Thus, the output voltage of the ring is effectively held to a constant level. The maximum retardation of impedance transformation then corresponds to no load condition and a high input impedance $Z_{IN}$ as indicated at point 55 on the No Load curve of FIG. 5. It is to be noted that a change in input impedance brings an accompanying change in operating frequency for the ring device 10, and that these variables are brought toward points 53 and 55, respectively, by providing more in-phase or out-of-phase operation of the primary feedback voltage with the primary alternating voltage of the ring. So that the variation of input impedance $Z_{IN}$ as a function of operating frequency is a predictable variation, it is desirable that the ring device 10 be operated along the linear portion of the No Load curve of FIG. 5 generally between points 53 and 55.

The variation between series resonance $F_s$ and parallel resonance $F_P$ along the No Load curve of FIG. 5 would provide a rather large adjustment for voltage regulation owing to the corresponding large variation in input impedance $Z_{IN}$. In actual practice, however, with ring loading the impedance function varies from the No Load curve of FIG. 5 toward that of the Full Load curve shown for the hoop mode. Unlike standard electromagnetic type transformers, the input impedance $Z_{IN}$ increases with loading and frequency response characteristics of input impedance can occur anywhere in the area marked "H" in FIG. 5. Under full load conditions, the ring's minimum impedance occurs at point 56 at an operating frequency slightly lower than point 53; thus a slight frequency shift can be expected as a consequence of a change in loading conditions. Additionally, the impedance fluctuation between the points 55 and 56 is reduced so that impedance (voltage) control between no load and full load conditions is not as extensive as is indicated between the points 53 and 55 of the No Load curve.

Operation of the ring device 10 above series resonance will cause the resonant device to appear as an equivalent inductive reactance. In changing the ring device 10 from an inductive reactance to substantially a pure resistive component at 53, the positive feedback loop 12 must provide a corresponding capacitive reactance to resistive component, respectively, that will sustain ring oscillation or operation. The equivalent impedance fluctuation for the ring causes the input voltage and input current phase relationships to vary between approximately 90° and 0°, respectively, with the ring driven from no load to its full output capability. When it is desired that the ring output voltage be restricted to less than the maximum available output, the range of phase variations between the ring input current and input voltage is correspondingly reduced. This can be accomplished simply by operating the ring device 10 above series resonance $F_s$ at a higher impedance level. The reduced power output for the ring 10 is a result of both input impedance and input current restrictions with the operating frequency being removed from its optimum point at 53.

Figure 6A:
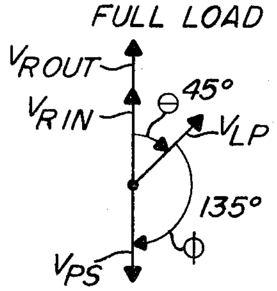
FIG. 6A and 6B are vector diagrams of the voltage relationships within the positive feedback circuit loop of the power supply circuit of FIG. 1.
Figure 6B:
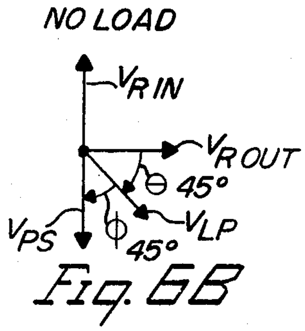

FIGS. 6A and 6B are vector diagrams illustrating the phase relationships for the primary feedback voltage within the positive feedback loop 12 under full load and no load conditions for the ring device 10, respectively. First considering the FIG. 6B, $V_{RIN}$ represents the primary alternating voltage of the ring; $V_{ROUT}$ represents the sampled primary feedback voltage at point 19 in FIG. 3 which also serves as a reference voltage. Ideally, the low pass filter characteristics of the filter means 13 contributes generally 45° capacitive phase shift as shown by the vector marked $V_{LP}$. Thereafter, the phase shifter 14 contributes an additional 45° to 135° for no load and full load conditions, respectively, as shown by the vector marked $V_{PS}$. The total phase shift through the positive feedback loop 12 then fluctuates between approximately 90° and 180° for no load and full load conditions with inversion through the amplifier driver circuit 11 generally adding another effective 180° to provide in-phase feedback to the ring 10 to sustain ring oscillation. Also, the resonance frequency of the filter means 13 can be adjusted closer to that of the ring device 10 to provide a means of compensating for the delay in the switching time for the driving transistors $T_1$ and $T_2$.

Voltage regulation for the ring device 10 under varying load conditions could be accomplished by several alternate principals, such as input amplitude control, input switching control, and input phase control. The negative feedback loop 15 of FIG. 1 provides automatic voltage regulation through input phase control via the phase shifter 14. This technique appears to offer the design advantage of employing a minimum number of control circuits.

The negative feedback loop 15 employs a sensing or sampling transducer 55 in the form of an AC capacitive type probe of a well known configuration to sense the amplitude of the ring's secondary output voltage. The probe 55 desirably should sample the voltage at a point substantially near the output electrode 18 for obtaining proper error signals in the desired voltage level while simultaneously avoiding arc-over possibilities. The sampled signal is generally in the form of a sine wave and is fed to a detector network 56 including an PNP-type detector transistor $T_4$ having its base electrode biased by a potentiometer 57. The emitter of transistor $T_4$ is connected directly to a third DC supply voltage $B_3$ and the base-emitter junction is protected against reverse biased voltages by a clamping diode $D_4$ which primarily is used to clamp the positive swings of the sampled sine wave to ground potential through the power supply $B_3$.

The transistor $T_4$ is normally non-conductive and conducts over part of the negative amplitude swings of the sampled signal so that pulses of the collector current therefrom fluctuate as a function of the amplitude swings. The collector of transistor $T_4$ is coupled to a smoothing filter network 58 generally in the form of a low pass filter, the configuration of which is self-explanatory and which operates to convert the fluctuating collector current of $T_4$ to a proportional DC signal.

The filtered DC signal is now fed to an amplifier network 60 including an NPN-type amplifier transistor $T_5$, the control winding or inductance coil 51, and the supply voltage $B_3$, which could be derived from supply voltage $B_1$ if desired. The base of transistor $T_5$ is connected to the filter network 58 through a base feed resistor 61 and to a base bias resistor 62 so that transistor $T_5$ is normally conductive during ring operation. The emitter of transistor $T_5$ is connected to ground potential and the collector is connected to the supply $B_3$ through the coil 51 and a current limiting resistor 59. Capacitor 63 is then provided as a filter for the supply $B_3$. It is apparent that the level of collector current of transistor $T_5$ that flows within the coil 51 is always proportional to the sampled signal of probe 55. Also, any change in secondary output voltage for the ring device 10 will result in a change in the degree of phase shift within the phase shifter 14 via the saturable reactor 49.

FIG. 2 shows an intended application for the saturable voltage regulation power supply circuit 9 in providing a constant high voltage supply to the screen of a picture tube 70 in a television receiver. The television receiver has receiver stages 72 which typically comprise a tuner, intermediate frequency amplifiers, a detector, and a video amplifier for driving the picture tube 70. In addition, stages 72 may include a synchronizing signal separator to derive vertical and horizontal synchronization signals from received composite video signals. Vertical deflection system 74 is connected to a deflection yoke 76 situated on the neck of the picture tube 70. Horizontal deflection system 78 is also synchronized by means of the received synchronizing pulses. The required high voltage energizing potential for tube 70 is developed separately from the vertical and horizontal synchronization signals.

The power supply circuit 9 utilizes the piezoelectric transformer unit 10 to develop a high voltage sine wave, rectify it with voltage rectifier 16 and apply it directly to the tube at terminal 79. Desirably, the operating frequency for the piezoelectric unit 10 should by substantially different from the frequency of the horizontal synchronization signals to eliminate interference therebetween. This can be achieved through proper design of the piezoelectric unit 10 so that its optimum resonant frequency is different from the established horizontal synchronizing frequency rate of 15,734 hertz at normal loads. In this television application, the ring is operated in its fundamental hoop mode with a typical series resonance frequency of some 20 to 22 kilohertz. It is characteristic of a television receiver to present a varying load depending upon the electron beam current within the picture tube 70. The operation of the power supply circuit 9 in this application is the same as described above in connection with FIG. 1, that is, as picture tube load changes such as during a changing brightness condition, the resonant operating frequency of the piezoelectric unit 10 shifts so that the voltage applied to the load remains constant.

Some practical considerations in employing the power supply circuit 9 with a television receiver are; (1) the operating frequencies of the ring 10 should be substantially different than the horizontal deflection frequency of the receiver to avoid viewable cross coupling between the two systems; (2) arc-over possibilities vary under varying humidity and altitude conditions; (3) the mechanical mount for the piezoelectric unit 10 should minimize damping; (4) an acoustical suppression cover may be required at the 20 to 22 kilohertz level; (5) the electrostatic field of the unit may couple into other low energy level circuits such as chroma circuits; and (6) the DC rectifiers should be connected as close as practical to the output terminal of the unit 10 to avoid shunt capacity voltage reductions.

Figure 7:
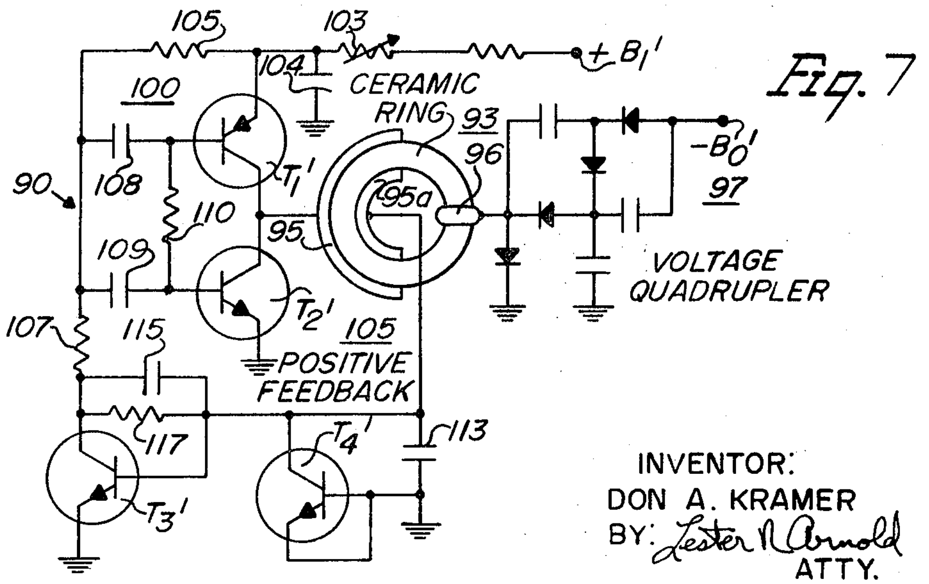
FIG. 7 is a schematic diagram of an alternative power supply circuit useful with a constant impedance load and including a piezoelectric ring.

FIG. 7 shows an alternative power supply circuit 90 capable of utilizing both bar-shaped and ring-shaped piezoelectric units for supplying a desired voltage to a substantially constant load. The operation of the supply circuit 90 is explained in connection with a ceramic ring device 93 similar in its construction and operation to ring 10, but is equally applicable to a bar-shaped device. The ring 93 has outer and inner electrodes 95 and 95a, an output electrode 96, and is operated within its fundamental hoop mode for transforming a low alternating primary (input) voltage into a relatively high alternating secondary (output) voltage. A voltage quadrupler rectifier circuit 97 is provided for converting the alternating secondary voltage to a negative value output voltage $B_0'$ useful for a particular application such as focus supplies.

The power supply circuit 90 includes an amplifier driver circuit 100 as a pulse generating means for driving the ring device 93 and a positive feedback circuit loop 105 for sustaining the operation of the ring by feeding the primary alternating voltage back to the ring 93 as a primary feedback voltage inphase with the primary alternating voltage. The supply circuit 90 does not require voltage regulation other than a minor adjustment provided by an adjustable limiting resistor 103 leading to the power supply voltage $B_1'$; therefore, there is no requirement in circuit 90 for a negative feedback circuit loop or a phase shifter control means.

The amplifier driver circuit 100 includes as its pulse generating means a pair of alternately conducting driving transistors $T_1'$ and $T_2'$ comprising switching means and controlled by the primary feedback voltage to switch conduction states at the rate of the ring's operating frequency during normal operation of the ring 93. As shown in FIG. 7, the transistors $T_1'$ and $T_2'$ are PNP and NPN types, respectively, and have their collectors coupled together and to the input of the ring 93. A capacitor 104 serving as a power supply filter is connected in series with the limiting resistor 103, and the junction therebetween is connected to the emitter of transistor $T_1'$ so that with conduction of $T_1'$ substantially the entire supply voltage $B_1'$ is made available to the input of the ring 93. Adjustment of resistor 103 provides a means of varying the drive to the ring 93 and thus the secondary output voltage.

A base bias resistor 105 is connected across the base-emitter junction of transistor $T_1'$, and base feed resistor 107 couples the primary feedback voltage of the positive loop 105 to the bases of both the transistors $T_1'$ and $T_2'$ through a pair of coupling capacitors 108 and 109 respectively. Further, the transistor bases are electrically separated by resistor 110 coupled therebetween. The positive feedback loop 105 includes an amplifying NPN-type transistor $T_3'$, a capacitive low pass filter made up of capacitors 113 and 115, and a clamping diode $T_4'$. A feedback resistor 117 and the capacitor 115 are connected across the base-collector junction of the transistor $T_3'$.

During the normal operation of the ring 93, the transistors $T_1'$ and $T_2'$ alternately conduct to provide a generally square wave driving voltage to the input of the ring device. The positive loop 105 picks up generally a sine wave voltage waveform of which the positive swings above a preselected level are eliminated by the transistor $T_3'$, and the negative swings of which are eliminated below a preselected level by the clamping diode $T_4'$. The resultant squared signal is amplified by transistor $T_3'$ and fed to the bases of transistor $T_1'$ and $T_2'$ through resistor 107.

The start-up of the supply circuit 90 is as follows: a current path is provided from the supply $B_1'$ to ground potential through the emitter-base junction of transistor $T_1'$, the resistor 110, and base-emitter junction of transistor $T_2'$; transistor $T_1'$ conducts a surge of voltage to the ring 93; the positive loop 105 provides a positive voltage to bias $T_2'$ on and $T_1'$ off and the energy is removed from the ring 93 to avoid a blocked condition. This cycle is repeatable ring 93 is brought into oscillatory operation at its operating frequency within the hoop mode.

While the present invention has been shown and described with reference to the preferred embodiments thereof, the invention is not limited to the precise forms set forth herein, and various modifications and changes may be made without departing from the spirit and scope thereof.

I claim:

1. A power supply circuit for use with a piezoelectric voltage transforming device, including in combination: a piezoelectric voltage transforming device having driving primary and loading secondary terminals and an electromechanical voltage transformation therebetween for transforming low primary alternating voltage to high secondary alternating voltage corresponding to the electrical loading in said loading terminals, said device having a plurality of mechanical vibrational modes for effecting said voltage transformation and a range of operating resonant frequencies in each mode with one mode being an optimum mode, a driving circuit connected to the driving primary terminals of said device for applying alternating drive signals thereto to cause said device to operate in said optimum mode at a preselected operating frequency, an electrical load connected to the loading terminals of said device for deriving power directly therefrom, a positive feedback circuit loop coupling said primary alternating voltage of said device to said driving circuit for forcing said drive signals to alternate at said preselected operating frequency, said positive circuit loop including a first frequency selective means selectively passing the range of operating frequencies of said optimum mode and excluding the operating frequencies of all other modes whereby the operation of said device in other vibrational modes is prevented, and said device comprising a second frequency selective means while operating at said preselected frequency and through coupling said preselected frequency to said driving circuit whereby the operating resonant frequency of said device is stabilized at said preselected frequency and said electromechanical voltage transformation is stabilized to provide a constant high level secondary voltage potential from said power supply circuit.

2. The power supply circuit of claim 1 wherein said piezoelectric voltage transforming device comprises a ceramic ring and said optimum mode is a fundamental hoop mode.

3. The power supply circuit of claim 1 wherein said electrical load is a variable load and changes therein cause corresponding changes in the operating resonant frequency of said device from said preselected frequency and corresponding changes in said electromechanical voltage transformation, said primary alternating voltage being coupled through said positive circuit loop to said driving circuit is a primary feedback voltage, said positive circuit loop includes a phase shifter control means for selectively adjusting the phase of said primary feedback voltage with corresponding changes in the operating resonant frequency of said device, and a negative feedback circuit loop monitors changes in said secondary alternating voltage to sense said changes in said operating resonant frequency and electromechanical voltage transformation resulting from load variations and couples said changes in secondary voltage to said phase shifter control means for controlling the phase adjustment thereof to effect a corresponding change in operating resonant frequency and electromechanical voltage transformation for said device whereby regulation of said secondary alternating voltage is achieved to provide a constant secondary output voltage from said power supply circuit for use with said variable load.

4. The power supply circuit of claim 3 wherein said phase shifter control means includes a load inductor coil of a saturable reactor and said negative feedback circuit loop includes a control inductor coil of said saturable reactor, and said changes in the secondary alternating voltage of said device cause corresponding changes in the inductance of said control coil to provide corresponding changes in the inductance of said load coil resulting in said phase adjustment of said primary feedback voltage.

5. The power supply circuit of claim 1 wherein said driving circuit includes switching means comprising a pair of alternately conducting transistors for developing said alternating drive signals supplied to said driving primary terminals of said device.

6. The power supply circuit of claim 1 wherein said first frequency selective means in said positive feedback circuit loop comprises a low pass filter network.

7. The power supply circuit of claim 1 wherein said first frequency selective means in said positive feedback circuit loop comprises a composite filter network having both low pass and band pass filtering characteristics.

8. In a television receiver including a picture tube having changing video patterns to comprise a varying electrical load, a power supply circuit for supplying a constant high level voltage potential thereto, including in combination: a piezoelectric voltage transforming device having driving primary and loading secondary terminals and electromechanical voltage transformation therebetween for transforming low primary alternating voltage to high secondary alternating voltage with said device operating at a first resonant frequency within a range of operating resonant frequencies, said electromechanical voltage transformation and said first resonant frequency changing with variations in said electrical load to effect changes in said secondary alternating voltage of said device, a driving circuit having switching means for developing alternating drive signals and coupling said signals to the driving primary terminals of said device to cause said device to operate at said first resonant frequency, a positive feedback circuit loop coupling said primary alternating voltage of said device to said driving circuit for forcing said switching means to alternate said drive signals at the particular operating resonant frequency of said device within said range including said first resonant frequency, and said positive circuit loop including a phase shifter control means for selectively adjusting the phase of the primary alternating voltage being coupled through said positive circuit loop, a negative feedback circuit loop monitoring changes in said secondary alternating voltage to sense said changes in electromechanical transformation and said operating resonant frequency caused by said load variations and coupling said changes in said secondary alternating voltage to said phase shifter control means for determining the phase adjustment thereof to effect corresponding changes in operating resonant frequency and electromechanical voltage transformation for said device whereby regulation of said secondary alternating voltage is achieved to provide a constant secondary output voltage from said power supply circuit for use with said variable electrical load.

9. The power supply circuit of claim 8 wherein said piezoelectric voltage transforming device includes a plurality of mechanical vibrational modes for effecting said electromechanical voltage transformation and has a range of operating resonant frequencies in each mode with one mode being an optimum mode and including said first resonant frequency, said positive circuit loop includes a first frequency selective means selectively passing the range of operating frequencies of the said optimum mode and excluding the operating frequencies of all other modes for preventing operation of said device in other vibrational modes, and said device comprises a second frequency selective means while operating at said particular operating frequency within said range including said first resonant frequency and through coupling said particular operating frequency to said driving circuit whereby the operating resonant frequency of said device is stabilized at said particular operating frequency until a subsequent variation of said electrical load occurs.

10. The power supply circuit of claim 9 wherein said device comprises a ceramic ring and said optimum mode is a fundamental hoop mode.

11. The power supply circuit of claim 9 wherein a rectifying means is coupled to said loading secondary terminals of said device for rectifying said high secondary alternating voltage prior to supplying said constant high level voltage potential to said picture tube.

12. In a television receiver, a power supply circuit for supplying a constant high level voltage potential to a varying electrical load, including in combination: a piezoelectric voltage transforming device having a plurality of mechanical vibrational modes and a range of operating resonant frequencies in each mode with one mode being an optimum mode, and having driving primary and loading secondary terminals and an electromechanical voltage transformation therebetween for transforming low primary alternating voltage to high secondary alternating voltage, said electromechanical voltage transformation changing with variations in said electrical load to effect changes in said secondary alternating voltage of said device, a driving circuit connected to the driving primary terminals of said device for applying alternating drive signals thereto to cause said device to operate in said optimum mode at particular operating frequencies within said range of frequencies corresponding to variations in said electrical load, a positive feedback circuit loop coupling said primary alternating voltage to said driving circuit for forcing said drive signals to alternate at said particular operating frequencies, said positive circuit loop including a first frequency selective means selectively passing the range of operating frequencies of said optimum mode and excluding the operating frequencies of all other modes for preventing operation of said device in other vibrational modes, and including a phase shifter control means for selectively adjusting the phase of the primary alternating voltage being coupled through said positive circuit loop, and a negative feedback circuit monitoring changes in said secondary alternating voltage to sense said changes in electromechanical transformation and operating resonant frequency for said device caused by said load variations and coupling said changes in said secondary alternating voltage to said phase shifter control means for determining the phase adjustment thereof to effect corresponding changes in electromechanical voltage transformation and operating frequency for said device whereby regulation of said secondary alternating voltage is achieved to provide a constant secondary output voltage from said power supply circuit for use with said variable electrical load.

* * * * *